(12) United States Patent
Kirichenko et al.

(10) Patent No.: US 12,175,995 B2
(45) Date of Patent: Dec. 24, 2024

(54) METHOD AND A SERVER FOR GENERATING A WAVEFORM

(71) Applicant: YANDEX EUROPE AG, Lucerne (CH)

(72) Inventors: Vladimir Vladimirovich Kirichenko, Moscow (RU); Aleksandr Aleksandrovich Molchanov, Zelenograd (RU); Dmitry Mikhailovich Chernenkov, Moscow (RU); Artem Valerevich Babenko, Dolgoprudnyy (RU); Vladimir Andreevich Aliev, Krasnogorsk (RU); Dmitry Aleksandrovich Baranchuk, Zhukovskiy (RU)

(73) Assignee: Y.E. Hub Armenia LLC, Yerevan (AM)

( * ) Notice: Subject to any disclaimer, the term of this patent is extended or adjusted under 35 U.S.C. 154(b) by 288 days.

(21) Appl. No.: 17/828,592

(22) Filed: May 31, 2022

(65) Prior Publication Data

US 2022/0392480 A1    Dec. 8, 2022

(30) Foreign Application Priority Data

Jun. 3, 2021   (RU) ............................ RU2021116052

(51) Int. Cl.
*G10L 21/10* (2013.01)
*G06N 3/045* (2023.01)
(Continued)

(52) U.S. Cl.
CPC .............. *G10L 21/10* (2013.01); *G06N 3/045* (2023.01); *G06N 3/08* (2013.01); *G10L 25/30* (2013.01)

(58) Field of Classification Search
USPC .................................................. 704/200–203
See application file for complete search history.

(56) References Cited

U.S. PATENT DOCUMENTS

| 11,017,761 B2 | 5/2021 | Peng et al. |
| 2019/0180732 A1 | 6/2019 | Ping et al. |

(Continued)

FOREIGN PATENT DOCUMENTS

| RU | 2557469 C2 | 7/2015 |
| RU | 2632424 C2 | 10/2017 |
| WO | 9904386 A1 | 1/1999 |

OTHER PUBLICATIONS

Angrick et al., "Speech synthesis from ecog using densely connected 3d convolutional neural networks", Published on Nov. 27, 2018, DOI: 10.1088/1741-2552/ab0c59, https://pubmed.ncbi.nlm.nih.gov/30831567/.

(Continued)

*Primary Examiner* — Leonard Saint-Cyr
(74) *Attorney, Agent, or Firm* — BCF LLP (57) ABSTRACT

There is provided servers and methods of generating a waveform based on a spectrogram and a noise input. The method includes acquiring a trained flow-based vocoder including invertible blocks, and an untrained feed-forward vocoder including non-invertible blocks, which form a student-teacher network. The method includes executing a training process in the student-teacher network during which the server generates (i) a teacher waveform by the trained flow-based vocoder using a first spectrogram and a first noise input, (ii) a student waveform by the untrained feed-forward vocoder using the first spectrogram and the first noise input, and (iii) a loss value for the given training iteration using the teacher waveform and the student waveform. The server then trains the untrained feed-forward vocoder to generate the waveform. The trained feed-forward (Continued)

vocoder in then used lieu of the trained flow-based vocoder for generating waveforms based on spectrograms and noise inputs.

14 Claims, 7 Drawing Sheets

(51) Int. Cl.
*G06N 3/08* (2023.01)
*G10L 25/30* (2013.01)

(56) References Cited

U.S. PATENT DOCUMENTS

| | | |
|---|---|---|
| 2019/0355347 A1 | 11/2019 | Arik et al. |
| 2019/0362703 A1 | 11/2019 | Ijima et al. |
| 2020/0342852 A1 | 10/2020 | Kim et al. |
| 2020/0402497 A1 | 12/2020 | Semenov et al. |
| 2021/0110810 A1 | 4/2021 | Ping et al. |
| 2021/0133539 A1* | 5/2021 | Srivastava ............ G06N 3/047 |
| 2022/0246132 A1* | 8/2022 | Zhang ................ G10L 15/063 |
| 2022/0284283 A1* | 9/2022 | Yin .......................... G06N 3/04 |
| 2022/0350968 A1* | 11/2022 | Rossi .................... G06F 40/284 |

OTHER PUBLICATIONS

Mwiti, "A 2019 Guide to Speech Synthesis with Deep Learning", Published on Aug. 28, 2019, https://heartbeat.fritz.ai/a-2019-guide-to-speech-synthesis-with-deep-learning-630afcafb9dd.

Salah et al., "Continuous vocoder in feed-forward deep neural network based speech synthesis", Published as a conference paper : Digital Speech and image processing (DOGS_2017), at Serbia, Novi Sad on Nov. 2017.

Ping et al. "ClariNet: Parallel Wave Generation in End-to-End Text-to-Speech", Feb. 22, 2019; https://arxiv.org/pdf/1807.07281. pdf, 15 pages.

Song, "Efficient WaveGlow: An Improved WaveGlow Vocoder with Enhanced Speed", Interspeech 2020, Oct. 25-29, 2020, Shanghai, China.

Wang, "KDGAN: Knowledge Distillation with Generative Adversarial Networks", 32nd Conference on Neural Information Processing Systems (NeurIPS 2018), Dec. 2-8, 2018, Montreal, Canada.

Russian Search Report dated Mar. 24, 2023 issued in respect of the counterpart Russian Patent Application No. RU 2021116052.

* cited by examiner

METHOD AND A SERVER FOR GENERATING A WAVEFORM

CROSS-REFERENCE

The present application claims priority to Russian Patent Application No. 2021116052, entitled "Method and a Server for Generating a Waveform", filed Jun. 3, 2021, the entirety of which is incorporated herein by reference.

FIELD

The present technology relates to generative modelling and, more particularly, to a method and a server for generating a waveform.

BACKGROUND

Generative modeling is an unsupervised learning task in machine learning that involves automatically discovering and learning the regularities or patterns in input data in such a way that the model can be used to generate or output new examples that plausibly could have been drawn from the original dataset. During the training process, a large collection of data in a particular domain can be gathered (e.g., millions of images, sentences, or sounds, etc.) and can be used to train a generative model to generate or synthesize data like it.

For example, Generative Adversarial Networks (GANs) use a technique for training a generative model by framing the problem as a supervised learning problem with two sub-models: the generator model that is trained to generate new examples, and the discriminator model that tries to classify examples as either "real" (from the domain) or "fake" (generated). The two models are trained together in a zero-sum game, adversarial, until the discriminator model is fooled about half the time, meaning the generator model is generating plausible examples.

In another example, Normalizing Flows (NF) models are a family of generative models with tractable distributions where both sampling and density evaluation can be efficient and exact. Applications include image generation, noise modelling, video generation, audio generation, graph generation, reinforcement learning, computer graphics, and physics.

Voice generation is used in a variety of different applications ranging from smart assistants to synthetic voices for people unable to speak on their own. Various methods for generating artificial voices have been developed, but it has been difficult to produce realistic and stylized voices in an efficient manner.

Generating images is used in a variety of different applications including resolution enhancing algorithms and image reconstruction. Various methods for generating artificial images have been developed, but it has been difficult to produce realistic image data in an efficient manner.

US patent application no. 2020/402497 discloses a system with a NF student network for learning the spectrogram distribution of a CNN teacher.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

In some aspects of the present technology, there is provided a knowledge distillation process between a teacher model and a student model, forming a "teacher-student" network. More particularly, the teacher model is embodied as a pre-trained flow-based model having invertible blocks, and the student model is embodied as an untrained feed-forward model having non-invertible blocks.

Developers of the present technology have devised a teacher-student network where the student architecture, in a sense, "sacrifices" invertibility of the teacher architecture in exchange for being a more compact and efficient model, when compared to the teacher architecture. Employing more compact and efficient models, in lieu of corresponding flow-based models, is beneficial for a variety of different computer-implemented applications, such as speech synthesis and super-resolution.

Flow-Based Models

Broadly speaking, a flow-based generative model is a generative model that explicitly models a probability distribution using the change-of-variable law of probabilities to transform a simple distribution into a complex one. The direct modeling of likelihood can provide many advantages. For example, the negative log-likelihood can be directly computed and minimized as the loss function. Additionally, novel samples can be generated by sampling from the initial distribution and applying the flow transformation. In contrast, many alternative generative modeling methods such as Variational AutoEncoder (VAE) and Generative Adversarial Network (GAN) do not explicitly represent the likelihood function.

It should be noted that flow-based models may make use of different classes of flow transformations such as, for example, autoregressive and bipartite transformations. Autoregressive transformations include Autoregressive Flow (AF) and Inverse Autoregressive Flow (IAF). AFs resemble autoregressive models, which allow for parallel density estimation but perform sequential synthesis. In contrast, IAF allow for parallel synthesis but perform sequential density estimation, making likelihood-based training very slow. A second group includes bipartite transformations, which allow for efficient likelihood-based training and parallel synthesis. However, bipartite flows are usually less expressive than AFs. Therefore, they require more layers and a larger number of parameters to reach comparable capacity.

Broadly speaking, a Normalizing Flow (NF) is a transformation of a simple probability distribution (e.g., a standard normal) into a more complex distribution by a sequence of invertible and differentiable mappings. The density of a sample can be evaluated by transforming it back to the original simple distribution and then computing the product of i) the density of the inverse-transformed sample under this distribution and ii) the associated change in volume induced by the sequence of inverse transformations. The change in volume is the product of the absolute values of the determinants of the Jacobians for each transformation, as required by the change of variables formula. The result of this approach is a mechanism to construct new families of distributions by choosing an initial density and then chaining together some number of parameterized, invertible and differentiable transformations. The new density can be sampled (by sampling from the initial density and applying the transformations) and the density at a sample (i.e., the likelihood) can be computed.

Developers of the present technology have realized that NF models are a powerful class of generative models demonstrating good performance in several speech and vision problems. As alluded to above, these models employ a change of variables formula that gives a "normalized" density after applying invertible transformations. The invertible transformations of such models can be composed with each other, and in a sense "flow", to create more complex invertible transformations. In contrast to other generative models, NF models are invertible, have tractable likelihoods, and allow for stable training. Since NF models allow for exact likelihood computation via change-of-variables formula, they can be trained by employing likelihood maximization techniques. As mentioned above, this property makes NF models more desirable in some situations than GAN models, for example, which require adversarial optimization and which can suffer from vanishing gradients, mode collapse, oscillating or cyclic behavior.

Some NFs may be configured to generate an output based on a noise input; however, other NFs may further be "conditioned" based on a conditioning input. Conditional NFs are gaining popularity in various practical speech and vision applications, and in particular for waveform synthesis, image super-resolution, and point cloud generation. Developers of the present technology have devised methods and systems that employ conditional flow-based models for image super-resolution and speech synthesis.

Super-Resolution Applications

Super-resolution (SR) is one of the fundamental image processing problems which aims to improve the quality of low-resolution (LR) images by upscaling them to high-resolution (HR) ones with natural high-frequency details. Developers of the present technology have realized that most approaches for image SR employ GAN models, which can be difficult to train due to the instability of adversarial optimization. In order to address this disadvantage, a SRFlow model can be used. How an SRFlow model can be implemented is disclosed in an article entitled "*SRFlow: Learning the Super-Resolution Space with Normalizing Flow*", published in 2020, and authored by Lugmayr et al., the contents of which is incorporated herein by reference in its entirety.

Broadly speaking, the SRFlow model has a flow-based architecture for estimating a full conditional distribution of natural HR images corresponding to a given LR image, parameters of which are trained by maximizing likelihood. More particularly, the architecture of a SRFlow model consists of LR encoder that delivers representative features of LR images to the invertible flow network. The flow network takes corresponding LR encoding along with a sample from initial distribution $z \sim N(0,I)$ and transforms them into SR image. The LR encoder is a popular feed-forward SR architecture based on Residual-in-Residual Dense Blocks (RRDB). This block applies multiple residual and dense skip connections, without any batch normalization layers. In order to form a LR representation at multiple levels, the activations after each RRDB block are concatenated. The flow network is organized into L levels, each operating at the resolution of $$\frac{H}{2^l} \times \frac{W}{2^l},$$

where $l \in 1, \ldots, L$ is the level index and H×W is the HR resolution. Each level first performs the squeeze operation that halves the spatial resolution. The squeeze operation is followed by a transition step that learns a linear invertible interpolation between neighboring pixels. Then, a sequence of conditional flow-steps is applied. At the end of each level, 50% of the channels are split off for likelihood estimation. Each flow-step consists of four different layers. First, the actnorm layer and 1×1 convolution are applied. Then, an affine injector and a conditional affine coupling layers follow.

In some embodiments of the present technology, the developers of the present technology have devised a teacher-student network where the teacher model is the SRFlow model, and the student model is a feed-forward model trained to be used for SR applications, in lieu of the corresponding SRFlow model.

Speech Synthesis Applications

Speech synthesis can be achieved by employing deep neural models, which are sometimes referred to as "neural vocoders". It should be noted that a neural vocoder can synthesize time-domain waveforms, and which can be conditioned on mel-spectrograms from a text-to-spectrogram model.

Most state-of-the-art neural vocoders are autoregressive models that provide good performance but suffer from a slow sequential generation process. The runtime requirements of autoregressive vocoders limit their deployment in real-time applications. Developers of the present technology have realized that there is a need for techniques that aim at speeding up the inference of such models. There are also GAN-based vocoders, however, they are generally inferior to autoregressive vocoders in terms of speech fidelity.

Developers of the present technology have realized that flow-based models can be successfully applied for parallel waveform synthesis with fidelity comparable to autoregressive models. Such flow-based vocoders include a WaveGlow model. How a WaveGlow model can be implemented is disclosed in an article entitled "*Waveglow: A Flow-Based Generative Network For Speech Synthesis*", published on Oct. 31, 2019, and authored by Prenger et al., the content of which is incorporated herein by reference in its entirety.

Broadly speaking, a WaveGlow vocoder contains a sequence of bipartite flow steps. Each flow step consists of an invertible 1×1 convolution followed by a conditional affine coupling layer. The WaveGlow vocoder is conditioned on upsampled mel-spectograms through affine coupling layers with WaveNet blocks. How a WaveNet block may be implemented is disclosed in an article entitled "*Wavenet: A Generative Model For Raw Audio*", published on Sep. 19, 2016, and authored by Aaron van den Oord et al., the contents of which is incorporated herein by reference in its entirety.

In some embodiments of the present technology, the developers of the present technology have devised a teacher-student network where the teacher model is the WaveGlow vocoder, and the student model is a feed-forward vocoder trained to be used for speech synthesis applications, in lieu of the corresponding WaveGlow vocoder.

To enable exact likelihood computation, NF architectures must be composed of invertible modules that also support efficient calculation of their Jacobian determinant. A large number of such modules have been recently developed, including autoregressive, bipartite, linear and residual transformations. While some modules are more efficient than others, NFs are generally inferior to feed-forward counterparts in terms of inference time. In particular, autoregressive flows use a slow sequential generation procedure, while bipartite flows can require a large number of submodules with low expressive power. Moreover, invertibility limits the size of activation maps between modules leading to bottlenecks and hence impractically deeper models.

However, in many practical applications, explicit density estimation may not be necessary during inference. As previously alluded to, developers of the present technology have realized that invertibility of NFs may be sacrificed for improving the runtime and memory consumption. Developers have realized that, at the training stage, one can benefit from stable training with the explicit likelihood objective from NFs, while at deployment, one can enjoy efficient inference from more compact feed-forward architectures.

Knowledge Distillation

In some aspects of the present technology, developers have devised a process for distilling knowledge from pre-trained flow-based models into compact and more efficient feed-forward architectures without the invertibility property of NF architectures.

Knowledge distillation is one of the most popular compression and acceleration techniques for large models and ensembles of neural networks. Broadly speaking, the idea of knowledge distillation is to train an efficient student on predictions produced by a computationally expensive teacher. It can be said that the knowledge distillation technique disclosed herein addresses the computational inefficiency of flow-based models and allows to transfer knowledge from NFs to feed-forward networks that are not required to be invertible.

In at least some embodiments of the present technology, there are devised training methods and a student design that allow for knowledge distillation from conditional NFs to feed-forward models with faster inference and/or lower memory consumption. It is contemplated that in at least some implementations of the present technology, the distillation processes disclosed herein may result in a faster inference with no perceptible loss in quality.

Distillation Procedure

Figure 4:
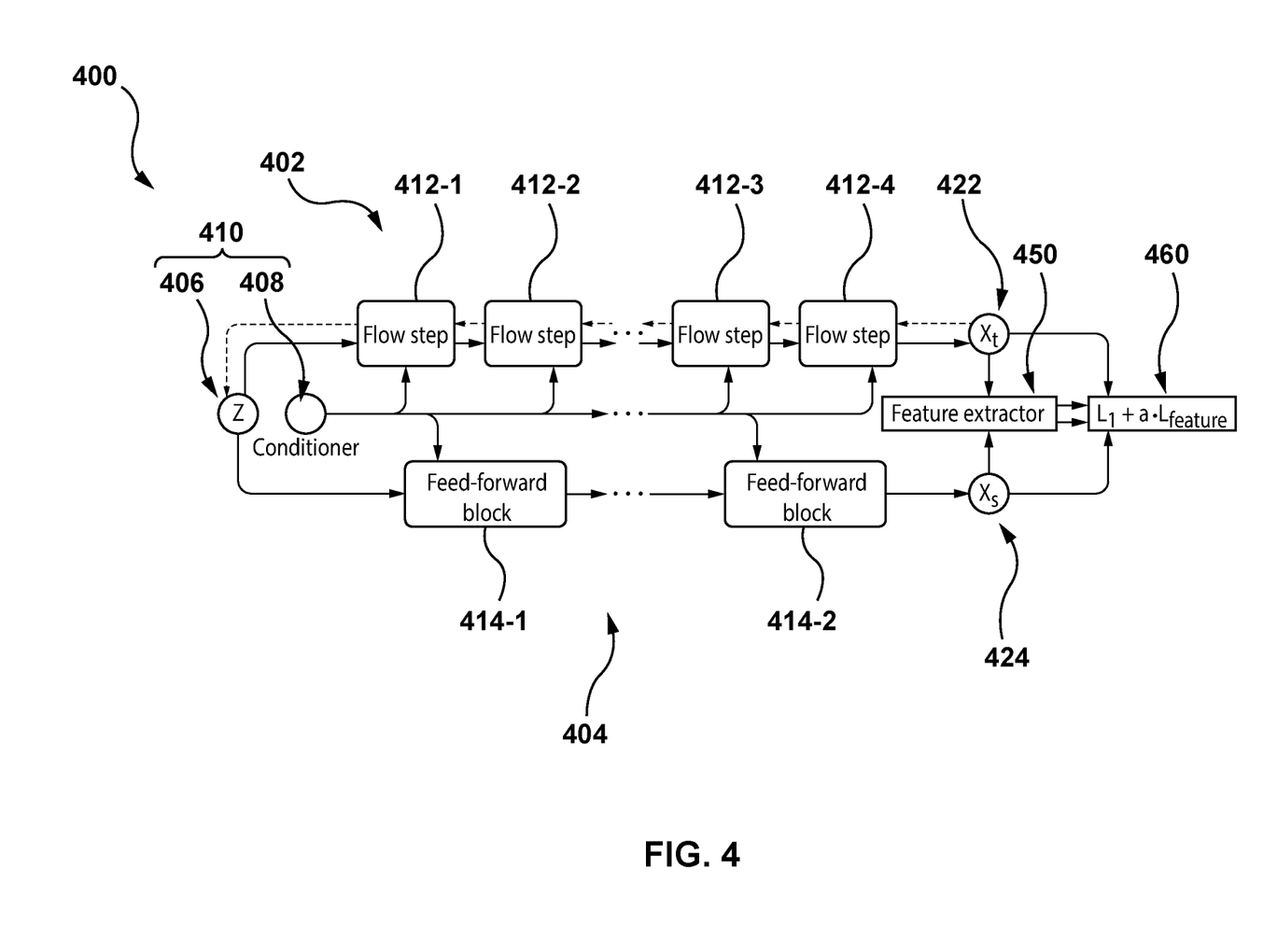
FIG. 4 depicts a representation of a teacher-student network hosted by the server, as envisioned in some embodiments of the present technology.

With reference to FIG. 4, there is depicted a representation of a teacher-student network 400 as envisioned in some embodiments of the present technology. The teacher-student network 400 comprises a teacher model, representing a teacher portion 402 of the network 400, and a student model, representing a student portion 404 of the network 400. It should be noted that the representation of the network 400 illustrated in FIG. 4 is a simplified representation of an actual teacher-student network that can be used in various implementations of the present technology. How the teacher-student network 400 can be implemented in some embodiments of the present technology is disclosed in an article entitled *"Distilling the Knowledge from Normalizing Flows"*, and which is appended herewith.

The teacher portion 402 comprises flow step blocks 412-1, 412-2, . . . , 412-3, and 412-4. It should be noted that the flow step blocks 412-1 to 412-4 are invertible blocks. Therefore, it can be said that the teacher portion 402 is an invertible (flow-based) model. The student portion 404 comprises feed-forward blocks 424-1, . . . , and 414-2. Therefore, it can be said that the student portion 404 is a non-invertible (feed-forward) model.

Both the teacher portion 402 and the student portion 404 are inputted with an input set 410 including a noise sample 406 (noise input) and contextual information 408 (conditioner). Developers of the present technology have realized that using the same input set 410 for the teacher portion 402 and the student portion 404 allows to train a non-invertible, feed-forward, student model based on an invertible, flow-based, teacher model.

As such, the input set 410 may be used by the teacher portion 402 for generating a teacher output sample 422, and by the student portion 404 for generating a student output sample 424. The teacher output sample 422 and the student output sample 424 may be used for computing a loss function 460. In the example illustrated in FIG. 4, a feature extraction model 450 may be used for extracting features from the teacher output sample 422 and the student output sample 424 for further use by the loss function 460.

How the teacher portion 402 and the student portion 404 may be designed by a person skilled in the art having appreciated the teachings enclosed herewith will now be discussed. However, other architectures to those non-exhaustively described herein can be used for forming a teacher-student network having a flow-based teacher model and a feed-forward student model.

Teacher Design

The teacher portion 402 may be implemented in a form of a pre-trained conditional flow-based model that defines a deterministic bijective mapping from a noise sample $z \sim N(0, \sigma I)$ and contextual information c to an output sample x. Developers of the present technology have realized that this mapping can be approximated by a more efficient model, in a supervised manner, using an objective loss function. More particularly, a combination of "reconstruction" losses and "feature" losses can be exploited by the loss function 460. In some implementations, the loss function 460 during training can be defined as defined as:

$$L = L_{rec} + \alpha \cdot L_{feature} \qquad (1)$$

where $\alpha$ is a hyperparameter that can be used for balancing respective loss terms. It is contemplated that a combination of reconstruction losses and feature losses may be used for a variety of applications, such as for speech synthesis applications and super-resolution applications.

For the reconstruction loss, for example, an average L1-norm between student and teacher samples can be used:

$$L_{rec} = \|T_\theta(z,c) - S_\psi(z,c)\|_1 \qquad (2)$$

where $T_\theta$ and $S_\psi$ correspond to teacher and student models, respectively, from the teacher-student network 400.

For the feature loss, for example, a distance between a set of feature representations of generated samples can be used.

In those implementations where the teacher-student network 400 is to be used for SR applications, such as during an SRFlow model distillation, for example, the feature loss may be a perceptual distance between generated images computed via a Learned Perceptual Image Patch Similarity (LPIPS) metric. The feature extraction model 450 may be implemented as a pre-trained VGG16 model g(x) (a convolutional neural network model) for LPIPS computation. In this case, a perceptual loss may be defined as follows:

$$L_{perceptual} = \|g(x^T) - g(s^T)\|_2 \qquad (3)$$

In those implementations where the teacher-student network 400 is to be used for speech synthesis applications, such as during a WaveGlow model distillation, for example, a multi-resolution Short-Time Fourier Transform (STFT) loss can be used, which is a sum of STFT losses with different analysis parameters (i.e., FFT size, window size, and frame shift).

For example, a single STFT loss may be a sum of a spectral convergence ($L_{SC}$) term and of a log STFT magnitude ($L_{mag}$) term. The multi-resolution STFT loss for M resolutions may be defined as:

$$L_{STFT} = \sum_{m=0}^{M} \left( L_{sc}^m + L_{mag}^m \right)$$

-continued $$L_{sc} = \frac{\|\,|STFT(x^T)| - |STFT(x^S)|\,\|_F}{\|\,|STFT(x^T)|\,\|_F}$$

$$L_{mag} = \|\log|STFT(x^T)| - \log|STFT(x^S)|\,\|_1$$

where $\|\cdot\|_F$ and $\|\cdot\|_1$ denote the Frobenius and L1 norms, respectively, and $|STFT(\cdot)|$ denotes the STFT magnitudes.

Developers of the present technology have realized that, after the distillation process, feed-forward student models are able to draw samples from the flow-based teacher model's latent distribution, and which allows them to generate diverse output samples for a given input and/or exploit the latent geometry to perform editing operations.

Student Design

Figure 5:
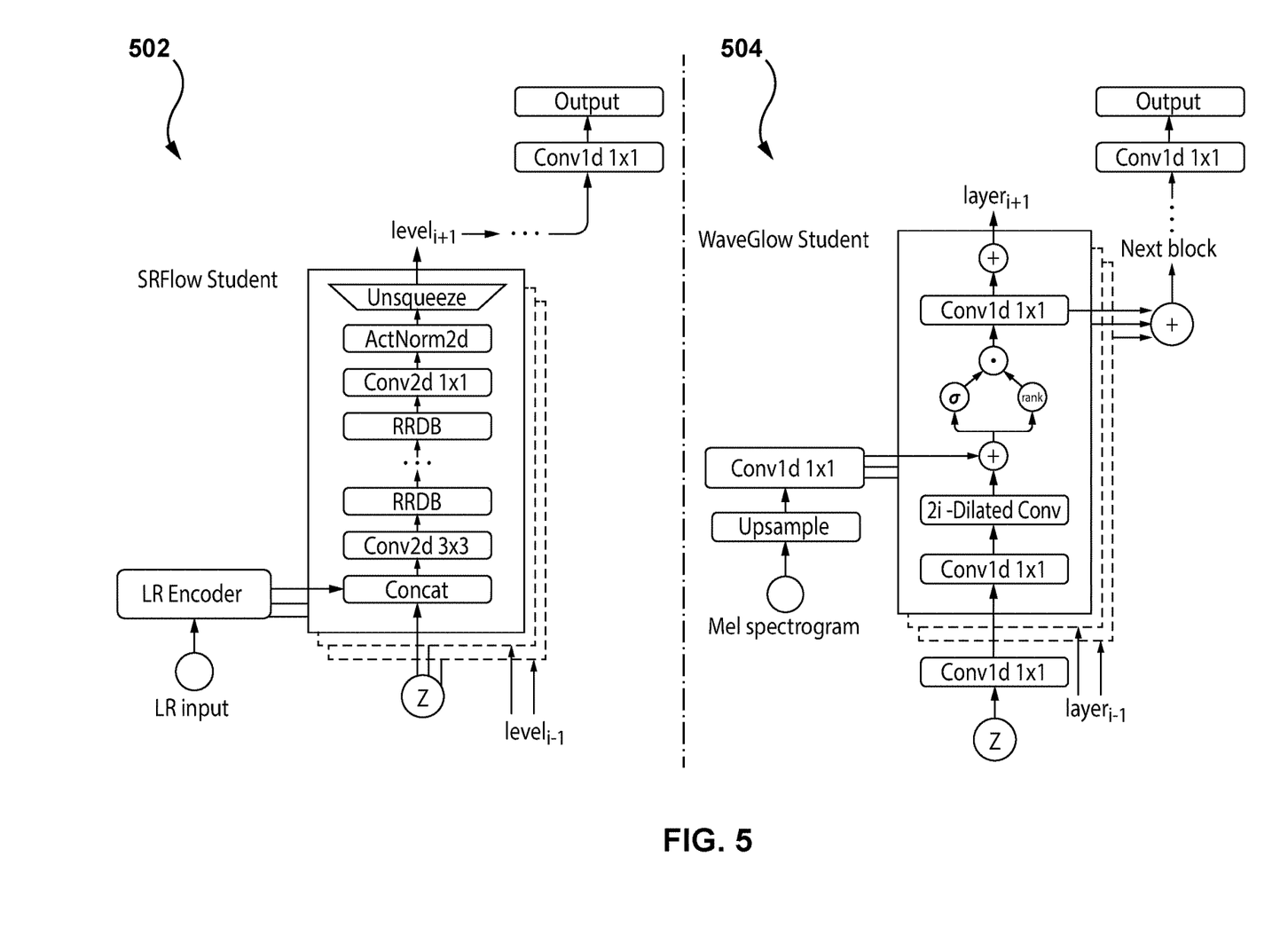
FIG. 5 depicts a representation of a first student architecture that is used by the voice-generation engine and of a second student architecture that is used by the image-generation engine, as envisioned in some implementations of the present technology.

With reference to FIG. 5, there is depicted a representation of a first student architecture 502 that can be used for SR applications. For example, the first student architecture 502 may be used for designing a SRFlow student model during distillation of a SRFlow teacher model. However, it should be noted that other architectures for teacher and student models may be used in other implementations for SR applications, without departing from the scope of the present technology.

Broadly speaking, the SRFlow student model consists of L levels. At each level, activations from the previous level are concatenated with a corresponding noise vector z and LR representation and passed through a sequence of RRDB blocks. Then, the transition step and unsqueeze operation are applied. The unsqueeze operation doubles a spatial resolution of feature maps and reduces their channel dimension by a factor of 4.

In FIG. 5, there is also depicted a representation a second student architecture 504 that can be used for speech synthesis applications. For example, the second student architecture 504 may be used for designing a WaveGlow student model during distillation of a WaveGlow teacher model. However, it should be noted that other architectures for teacher and student models may be used in other implementations for speech synthesis applications, without departing from the scope of the present technology.

Broadly speaking, the WaveGlow student model is a sequence of conditional WaveNet blocks. Each WaveNet block is organized into several residual layers, each of which consists of a dilated convolution followed by a gated activation unit and 1×1 convolution. The upsampled mel-spectrograms are added to intermediate activations before the gated activation unit. In contrast to a WaveGlow teacher model, the WaveGlow student model does not inject noise between intermediate WaveNet blocks but obtains the entire z at the very beginning.

As alluded to above, irrespective of a specific implementation of the flow-based teacher model and the feed-forward student model, developers of the present technology have devised a teacher-student network where the student architecture, in a sense, "sacrifices" invertibility of the teacher architecture in exchange for being a more compact and efficient model. The architecture of a student model (such as the first student architecture 502 and the second student architecture 504) may share some similarities with the architecture of a corresponding flow-based teacher model, in some implementations of the present technology—however, notable differences can be present.

First, in contrast to a flow-based teacher model, student's layers may be organized in reverse order because a student model may represent the teacher's "inverse pass" (sequence of blocks).

Second, flow layers are replaced with commonly used feed-forward modules for corresponding tasks. In those implementations where the teacher-student network 400 is to be used for SR applications, such as during an SRFlow model distillation, for example, the flow steps of the SRFlow teacher model may be replaced by stacked RRDBs in the corresponding SRFlow student model. In those implementations where the teacher-student network 400 is to be used for speech synthesis applications, such as during a WaveGlow model distillation, for example, the flow steps of the WaveGlow teacher model may be replaced by WaveNet blocks in the WaveGlow student model.

Third, since the feed-forward student model no longer has to be reversible, a number of hidden channels between modules of the student model may be varied. Varying the number of hidden channels may reduce bottlenecks in the feed-forward student model. Developers of the present technology have realized that such student architectures may need fewer blocks than a corresponding teacher architecture to achieve similar performance.

Fourth, in conditional NF models, the context information is constantly injected through conditional flow layers. After replacing those layers, this information needs to be incorporated into the network. In those implementations where the teacher-student network 400 is to be used for SR applications, such as during an SRFlow model distillation, for example, LR encodings in the SRFlow student model may be concatenated with intermediate activations at the beginning of each level. In those implementations where the teacher-student network 400 is to be used for speech synthesis applications, such as during a WaveGlow model distillation, WaveGlow student model may retain its original conditioning mechanism through WaveNet blocks.

In a first broad aspect of the present technology, there is provided a method of generating a waveform based on a spectrogram and a noise input. The spectrogram has been generated based on a text. The waveform is a digital audio representation of the text. The method is executable by a server. The method comprises acquiring, by the server, a trained flow-based vocoder including a plurality of invertible blocks. The trained flow-based vocoder has been trained to generate the waveform based on the spectrogram and the noise input. The method comprises acquiring, by the server, an untrained feed-forward vocoder including a plurality of non-invertible blocks. The trained flow-based vocoder and the untrained feed-forward vocoder form a student-teacher network. The method comprises executing a training process in the student-teacher network. During a given training iteration of the training process the method comprises: generating, by the server, a teacher waveform by the trained flow-based vocoder using a first spectrogram and a first noise input, generating, by the server, a student waveform by the untrained feed-forward vocoder using the first spectrogram and the first noise input, generating, by the server, a loss value for the given training iteration using the teacher waveform and the student waveform, and training, by the server, the untrained feed-forward vocoder to generate the waveform using the loss value for approximating a mapping between the first noise input and the teacher waveform of the flow-based vocoder. The method comprises acquiring, by the server, the spectrogram and the noise input. The method comprises using, by the server, the trained feed-forward vocoder in lieu of the trained flow-based vocoder for generating the waveform based on the spectrogram and the noise input.

In some embodiments of the method, the spectrogram is a mel-scaled spectrogram.

In some embodiments of the method, the noise input is representative of a Gaussian distribution of noise values.

In some embodiments of the method, the method further comprises storing, by the server, the trained feed-forward vocoder in a storage.

In some embodiments of the method, the loss value is a combination of a reconstruction-based loss value and a feature-based loss value, where the reconstruction-based loss value is representative of a difference between the teacher waveform and the student waveform, and the feature-based loss value is representative of a difference between features of the teacher waveform and features of the student waveform.

In some embodiments of the method, the trained flow-based vocoder is a conditional normalizing-flow-based vocoder.

In some embodiments of the method, the trained feed-forward vocoder is a Convolutional Neural Network (CNN) based vocoder.

In a second broad aspect of the present technology, there is provided a method of generating an output using a conditioning input and a noise input. The method is executable by a server. The method comprises acquiring, by the server, a trained conditional flow-based model including a plurality of invertible blocks, where the trained conditional flow-based model has been trained to generate the output based on the conditioning input and the noise input. The method comprises acquiring, by the server, an untrained feed-forward model including a plurality of non-invertible blocks, where the trained conditional flow-based model and the untrained feed-forward model form a student-teacher network. The method comprises executing a training process in the student-teacher network. During a given training iteration of the training process the method comprises: generating, by the server, a teacher output by the trained conditional flow-based model using a first conditioning input and a first noise input, generating, by the server, a student output by the untrained feed-forward model using the first conditioning input and the first noise input, generating, by the server, a loss value for the given training iteration using the teacher output and the student output, and training, by the server, the untrained feed-forward model by using the loss value for approximating a mapping between the first noise input and the teacher output of the conditional flow-based model. The method comprises acquiring, by the server, the conditioning input and the noise input. The method comprises using, by the server, the trained feed-forward model in lieu of the trained conditional flow-based model for generating the output based on the conditioning input and the noise input.

In some embodiments of the method, the trained conditional flow-based model is a trained conditional flow-based vocoder, the trained feed-forward model is a trained feed-forward vocoder, the conditioning input is a spectrogram, and the output is a waveform.

In some embodiments of the method, the trained conditional flow-based model is a trained conditional flow-based image enhancing model, the trained feed-forward model is a trained feed-forward image enhancing model, the conditioning input is a first image, the output is a second image, the second image is of a higher resolution than the first image.

In a third broad aspect of the present technology, there is provided a server for generating a waveform based on a spectrogram and a noise input. The spectrogram has been generated based on a text. The waveform is a digital audio representation of the text. The server is configured to acquire a trained flow-based vocoder including a plurality of invertible blocks, where the trained flow-based vocoder has been trained to generate the waveform based on the spectrogram and the noise input. The server is configured to acquire an untrained feed-forward vocoder including a plurality of non-invertible blocks, where the trained flow-based vocoder and the untrained feed-forward vocoder form a student-teacher network. The server is configured to execute a training process in the student-teacher network. During a given training iteration of the training process the server being configured to: generate a teacher waveform by the trained flow-based vocoder using a first spectrogram and a first noise input, generate a student waveform by the untrained feed-forward vocoder using the first spectrogram and the first noise input, generate a loss value for the given training iteration using the teacher waveform and the student waveform, and train the untrained feed-forward vocoder to generate the waveform using the loss value for approximating a mapping between the first noise input and the teacher waveform of the flow-based vocoder. The server is configured to acquire the spectrogram and the noise input. The server is configured to use the trained feed-forward vocoder in lieu of the trained flow-based vocoder for generating the waveform based on the spectrogram and the noise input.

In some embodiments of the server, the spectrogram is a mel-scaled spectrogram.

In some embodiments of the server, the noise input is representative of a Gaussian distribution of noise values.

In some embodiments of the server, the server is further configured to store the trained feed-forward vocoder in a storage.

In some embodiments of the server, the loss value is a combination of a reconstruction-based loss value and a feature-based loss value, where the reconstruction-based loss value is representative of a difference between the teacher waveform and the student waveform, and the feature-based loss value is representative of a difference between features of the teacher waveform and features of the student waveform.

In some embodiments of the server, the trained flow-based vocoder is a conditional normalizing-flow-based vocoder.

In some embodiments of the server, the trained feed-forward vocoder is a Convolutional Neural Network (CNN) based vocoder.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix A is provided at the end of the present specification. The Appendix A includes a copy of a yet to be published article entitled "*Distilling the Knowledge from Normalizing Flows*". This article provides additional background information, description of implementations of the non-limiting embodiments of the present technology, as well as some additional examples. The entirety of this article is incorporated herein by reference, in all those jurisdictions where such incorporation by reference is allowed.

DETAILED DESCRIPTION

Figure 1:
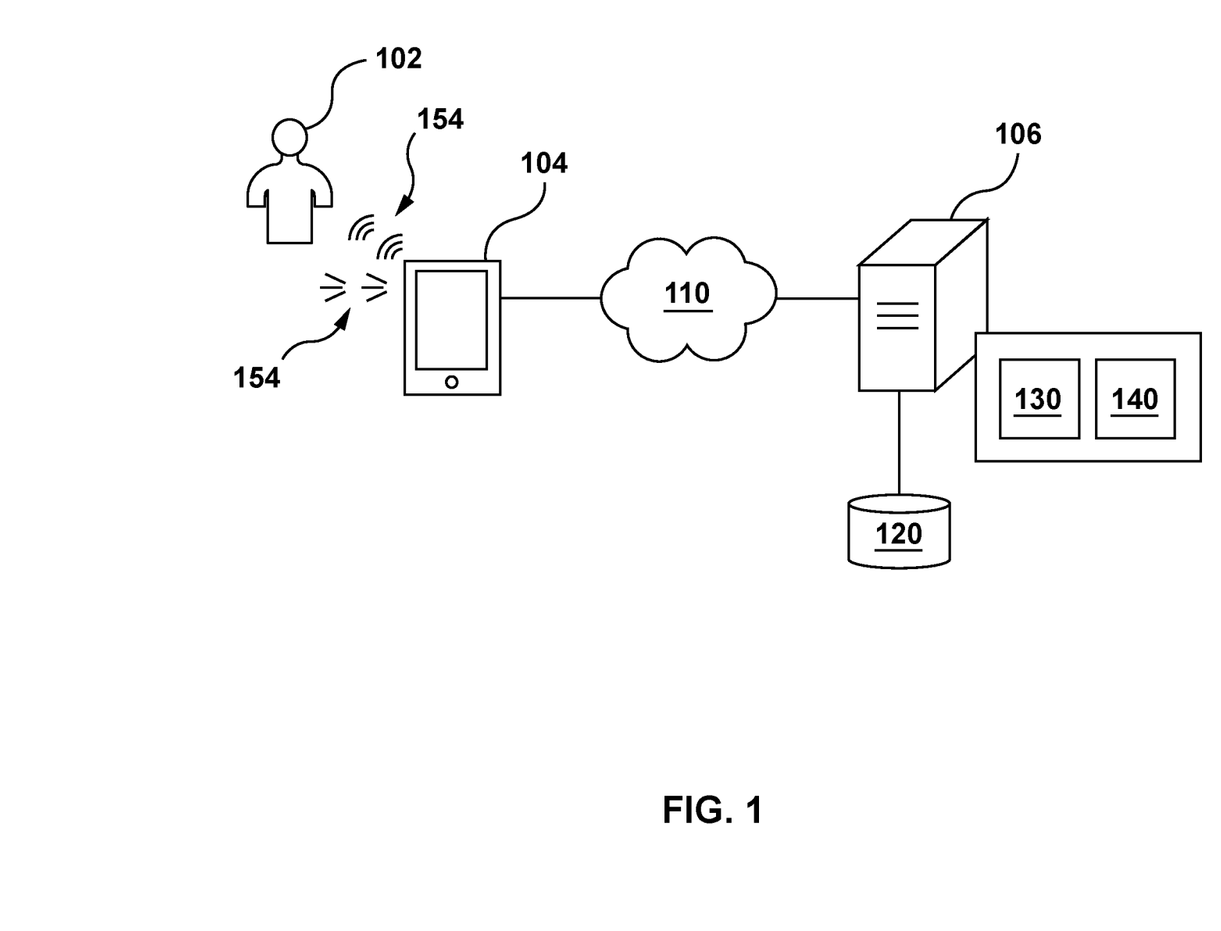
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide visual and/or audible indications to a user 102. For example, a sound indication 152 (spoken utterances or "machine-generated utterance") may be provided by an electronic device 104 (or simply a "device 104") to the user 102. In another example, a visual indication 154 (a visual representative of a digital image or of a "machine-generated" digital image) may be provided by the device 104 to the user 102. Various components of the system 100 and how these components may be configured for providing the sound indication 152 and of the visual indication 154 will now be described in turn.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order to provide or reproduce the sound indication 152. For example, the device 104 may comprise one or more microphones for detecting or capturing sound and one or more speakers for providing or reproducing the sound indication 152.

It is contemplated that the device 104 comprises hardware and/or software and/or firmware (or a combination thereof), as is known in the art, in order to provide or reproduce the visual indication 154. For example, the device 104 may have a screen or other display component for rendering and displaying the visual indication 154.

In some embodiments, the device 104 may comprise hardware and/or software and/or firmware (or a combination thereof), as is known in the art, in order to execute an Intelligent Personal Assistant (IPA) application (not illustrated). Generally speaking, the purpose of the IPA application, also known as a "chatbot", is to enable the user 102 to submit queries in a form of spoken utterances and, in response, provide to the user 102 responses in a form of spoken utterances (e.g., the sound indication 152).

Submission of queries and provision of responses may be executed by the IPA application via a natural language user interface. Generally speaking, the natural language user interface of the IPA application may be any type of computer-human interface where linguistic phenomena such as verbs, phrases, clauses and the like act as user interface controls for extracting, selecting, modifying or otherwise generating data in the IPA application.

For example, when spoken utterances of the user 102 are detected (i.e. captured) by the device 104, the IPA application may employ its natural language user interface in order to analyze the spoken utterances of the user 102 and extract data therefrom which is indicative of user queries. Also, data indicative of responses received by the device 104, is analyzed by the natural language user interface of the IPA application in order to provide or reproduce spoken utterances (e.g., the sound indication 152) indicative of those responses.

In at least some embodiments of the present technology, as it will become apparent from the description herein below, the electronic device 104 may be configured to receive data for reproducing the sound indication 152 from a server 106. This means that in some embodiments the server 106 may be configured to synthetize waveforms in real-time and transmit data representative of these waveforms (in segments, for example) to the device 104 that in turn is configured to use this data for reproducing of the sound indication 152 for the user 102.

In other embodiments, the device 104 may comprise hardware and/or software and/or firmware (or a combination thereof), as is known in the art, in order to execute an image enhancement application. Generally speaking, the purpose of the image enhancement application, is to enable the user 102 to submit a low-quality image and, in response, provide to the user 102 with an enhanced version of that image (e.g., the visual indication 154).

In at least some embodiments of the present technology, as it will become apparent from the description herein below, the electronic device 104 may be configured to receive data for displaying the visual indication 154 from the server 106. This means that in some embodiments the server 106 may be configured to use a Super-Resolution (SR) process of upscaling and/or improving the details within the low quality digital image and transmit data representative of this SR image to the device 104 that in turn is configured to use this data for displaying the visual indication 154 for the user 102.

Communication Network

In the illustrative example of the system 100, the device 104 is communicatively coupled to a communication network 110 for accessing and transmitting data packets to/from a server 106 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server

106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Broadly speaking, the server 106 is configured to synthesize waveforms for provision of the sound indication 152 and/or to generate SR digital images for display of the visual indication 154. It can be said that the server 106 may be used for speech synthesis applications and/or super-resolution applications, in various implementations of the present technology.

In some embodiments, the server 106 may receive a text and, in response, generate a waveform representing the uttered text. For that purpose, the server 106 may host a voice-generation engine 130. Broadly speaking, the voice-generation engine 130 comprises one or more machine learning algorithms that enable the server 106 to synthesize an "audio output" representative of a text. As it will be described in greater details herein further below with reference to FIG. 2, the voice-generation engine 130 may comprise a first model configured to generate a mel-spectogram based on a text input, and a second model configured to employ the mel-spectrogram for synthesizing a waveform. It can be said that the first model is a text-to-spectrogram model. It can also be said that that the second model is a neural vocoder configured to synthesize time-domain waveforms, and which can be conditioned on mel-spectrograms from the text-to-spectrogram model.

In other embodiments, the server 106 may receive a low-quality digital image and, in response, generate a high-quality digital image. For that purpose, the server 106 may host an image-generation engine 140. Broadly speaking, the image-generation engine 140 comprises one or more machine learning algorithms that enable the server 106 to perform SR processing of digital images. As it will be described in greater details herein further below with reference to FIG. 3, the voice-generation engine 130 may comprise a model configured to generate an SR image by upscaling a LR image to a higher resolution.

The server 106 may have access to a memory device (not illustrated). The server 106 is configured to use the memory device in order to store data processed by at least some components of the voice-generation engine 130 and/or the image-generation engine 140. In some embodiments, the memory device may be integral to the server 106. However, it is contemplated that the memory device may be a remote memory device from the server 106, without departing from the scope of the present technology.

In at least one embodiments of the present technology, the memory device may a "Graphical Processing Unit" (GPU) device. Broadly speaking, a GPU device comprises a specialized processor with dedicated memory that conventionally performs floating point operations required for rendering graphics. GPU-type memory devices can be optimized for deep learning models as they can process multiple computations simultaneously. In other words, deep learning models can be trained faster using GPU-type memory devices, as opposed to "Central Processing Unit" (CPU) type devices, by running operations in parallel (at the same time), instead of sequentially (one after the other).

Indeed, GPU-type memory devices can have a large number of cores, which allows for better computation of multiple parallel processes. Additionally, computations in deep learning need to handle huge amounts of data which makes bandwidth of GPU-type memory devices most suitable.

In fact, a few parameters may make GPUs more advantageous than CPUs for deep learning applications. Bandwidth is one of the main reasons why GPUs are faster for computing than CPUs. With large datasets, CPUs take up a lot of memory while training the model. On the one hand, computing huge and complex tasks take up a lot of clock cycles in a CPU-type memory device. CPUs take up jobs sequentially and have comparatively fewer cores. On the other hand, GPUs come with dedicated VRAM (Video RAM) memory. Also, training a model in deep learning requires a large dataset, hence the large computational operations in terms of memory. To compute the data efficiently, a GPU-type memory device may be a more suitable choice—the larger the number of computations, the more the advantage a GPU-type memory device can have over a CPU-type memory device.

Database System

The server 106 is communicatively coupled to a database system 120. Generally speaking, the database system 120 is configured to store information extracted and/or generated by the server 106 during processing. For example, the database system 120 may receive data from the server 106 which was extracted and/or generated by the server 106 during processing for temporary and/or permanent storage thereof and may provide stored data to the server 106 for further use thereof.

The database system 120 can be configured to store spectrogram data and waveform data. Broadly speaking, spectrogram data and waveform data may be used by the server 106 for training at least some components of the voice-generation engine 130. For example, the server 105 may be configured to generate a given spectrogram based on a given waveform thereby forming a spectrogram-waveform pair. The server 106 may generate and store in the database 120 a large number of such spectrogram-waveform pairs for training a vocoder. In at least some embodiments, a given spectrogram-waveform pair may be employed for generating a group of training sets for a vocoder. For example, a spectrogram and a waveform from a given pair may be split into a number of corresponding portions, and where a pair of a first spectrogram portion and of a first waveform portion may be used together during a first training iteration, and a pair of a second spectrogram portion and of a second waveform portion may be used together during a second training iteration.

The database system 120 can be configured to store image data. Broadly speaking, image data may be used by the server 106 for training at least some components of the image-generation engine 140. For example, the server 106 may be configured to generate a LR image based on a given HR image thereby forming an LR-HR image pair. A variety of down-sampling techniques may be used by the server 106 for generating a given LR image. The server 106 may generate and store in the database 120 a large number of such LR-HR image pairs for training SR algorithms. In at least some embodiments, a given LR-HR image pair may be employed for generating a group of training sets for the SR algorithm. For example, an LR image and a HR image from a given pair may be split into a number of corresponding portions, and where a pair of a first LR image portion and of a first HR image portion may be used together during a first training iteration, and a pair of a second LR image portion and of a second HR image portion may be used together during a second training iteration.

The database system 120 can be configured to store noise data. Broadly speaking, noise data may be used by the server 106 for training and/or using at least some components of the voice-generation engine 130 and the image-generation engine 140. For example, the database system 120 may store a plurality of noise distributions, such as Gaussian distributions of noise. These noise distributions may be employed during an in-use phase of a flow-based vocoder. These noise distributions may also be employed during training and in-use phases of a feed-forward vocoder. These noise distributions may further be employed during an in-use phase of a flow-based SR algorithm. These noise distributions may also be employed during training and in-use phases of a feed-forward SR algorithm.

Voice-Generation Engine

Figure 2:
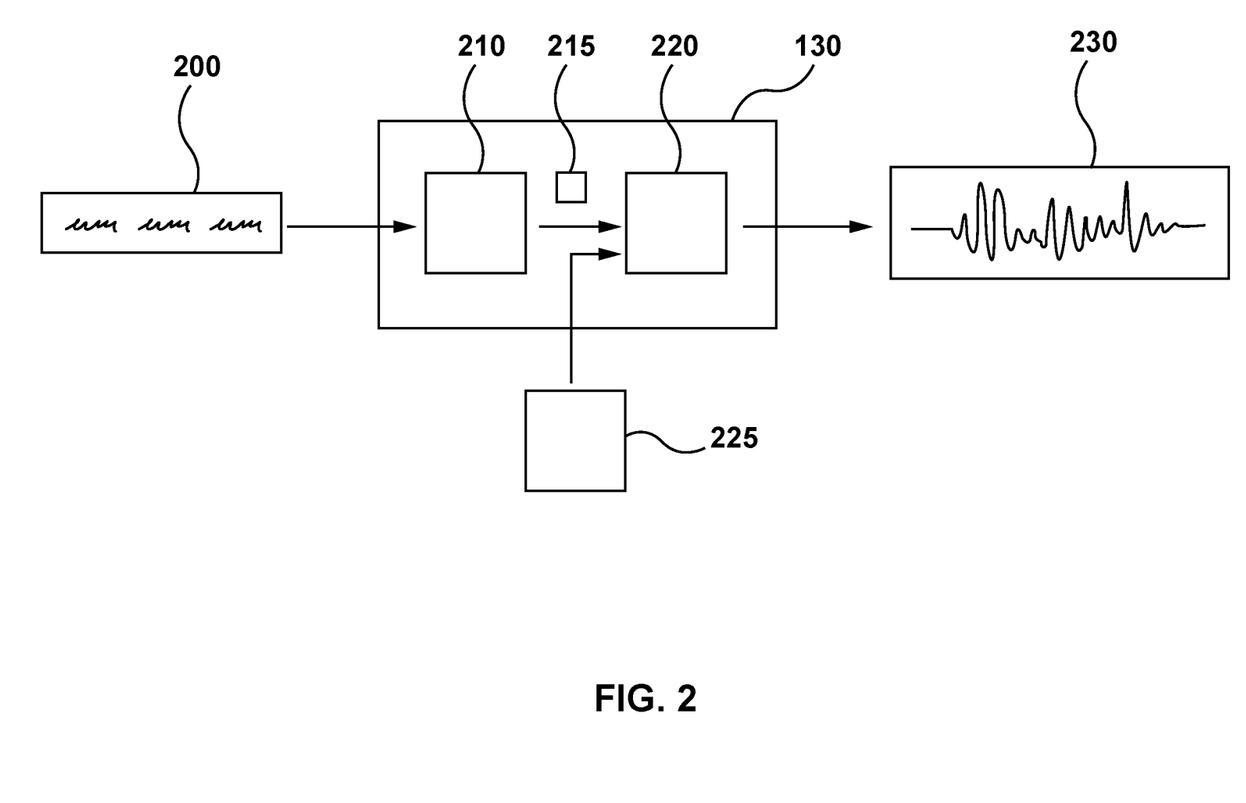
FIG. 2 depicts a representation of a voice-generation engine hosted by a server of FIG. 1, as envisioned in some implementations of the present technology.

With reference to FIG. 2, there is depicted a representation of how the voice-generation engine 130 may be configured to use a textual input 200 and a noise input 225 for generating a waveform 230. The server 106 may acquire the textual input 200 in a variety of ways. In one non-limiting example, the textual input 200 may be representative of content to be provided to the user 102.

Irrespective of how the server 106 acquires and/or generates the textual input 200, the purpose is to process the textual input 200 by the voice-generation engine 130 for generating the waveform 230 (being in audio representation of the textual input 200) so that it can be provided to the user 102 as a machine-generated utterance. To that end, the voice-generation engine 130 comprises a text-to-spectrogram model 210 configured to generate a spectrogram 215 based on the textual input 200, and a vocoder 220 configured to synthesize the waveform 230 based on the spectrogram 215 and the noise input 225.

How the text-to-spectrogram model 210 is implemented is not particularly limited. In one non-limiting example, the server 106 may be configured to use a given machine learning algorithm that has been trained to generate spectrogram data based on textual inputs. In one non-limiting implementation of the present technology, the text-to-spectrogram model 210 may be implemented via a "Tacotron", which is a sequence-to-sequence machine learning architecture for producing magnitude spectrograms from a sequence of characters. In some embodiments, the spectrogram 215 may be a MEL spectrogram, meaning that one of the axes on the spectrogram has a MEL scale.

In the context of the present technology, the vocoder 220 is embodied as a feed-forward vocoder. It can be said that the feed-forward vocoder 220 is a feed-forward generative model configured to synthesize a waveform based on the spectrogram 215 and the noise input 225. The feed-forward vocoder 220 may be trained by executing a distillation process of a corresponding flow-based vocoder. The distillation process of a given flow-based vocoder for training the feed-forward vocoder 220 has been described above with reference to FIG. 4. In at least some implementations of the present technology, the feed-forward vocoder 220 may have the first student architecture 502 described above with reference to FIG. 5. Furthermore, in some embodiments of the present technology, the feed-forward vocoder 220 can be trained and used in a similar manner to what is disclosed in the article appended herewith.

Image-Generation Engine

Figure 3:
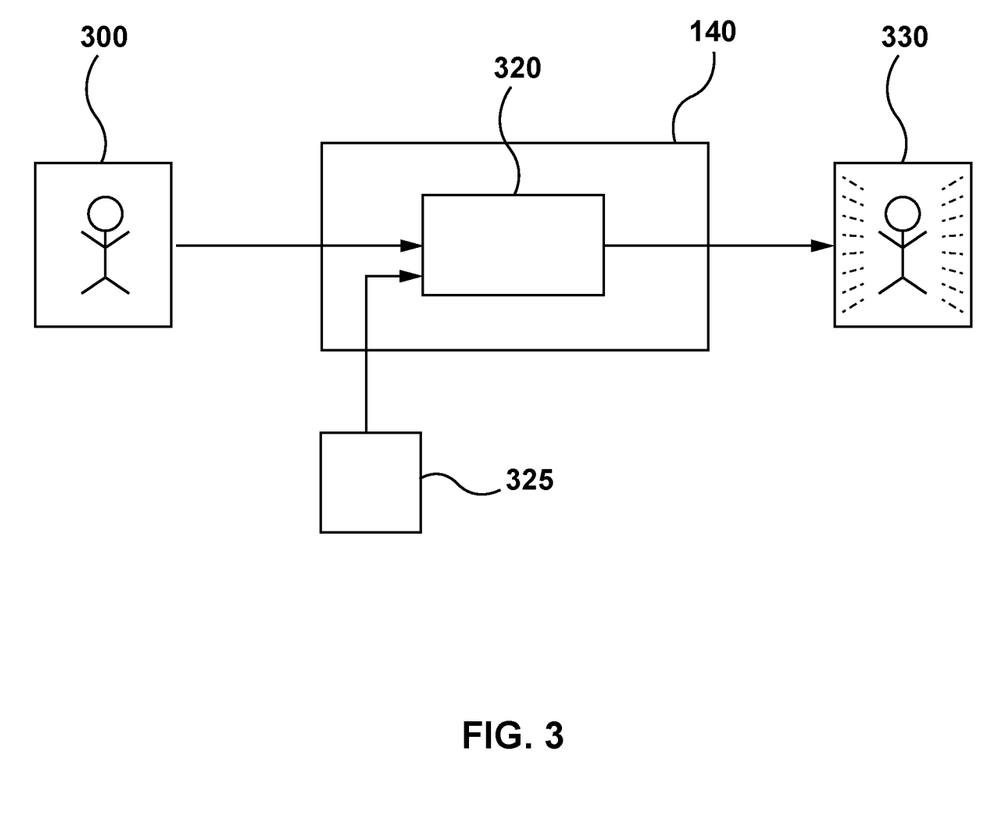
FIG. 3 depicts a representation of an image-generation engine hosted by the server, as envisioned in some implementations of the present technology.

With reference to FIG. 3, there is depicted a representation of how the image-generation engine 140 may be configured to use a LR image 300 and a noise input 325 for generating a HR image 330. The server 106 may acquire the LR image 300 in a variety of ways.

Irrespective of how the server 106 acquires the LR image 300, the purpose is to process the HR image 300 by the image-generation engine 140 for synthesizing SR pixels so that it can be provided to the user 102 as a machine-generated image. To that end, the image-generation engine 140 comprises a feed-forward SR model 320. It can be said that the feed-forward SR model 320 is a feed-forward generative model configured to synthesize a HR image based on the LR image 300 and the noise input 325. The feed-forward SR model 320 may be trained by executing a distillation process of a corresponding flow-based SR model. The distillation process of a given flow-based SR model for training the feed-forward SR model 320 has been described above with reference to FIG. 4. In at least some implementations of the present technology, the feed-forward SR model 320 may have the second student architecture 504 described above with reference to FIG. 5. Furthermore, in some embodiments of the present technology, the feed-forward vocoder 220 can be trained and used in a similar manner to what is disclosed in the article appended herewith.

Figure 6:
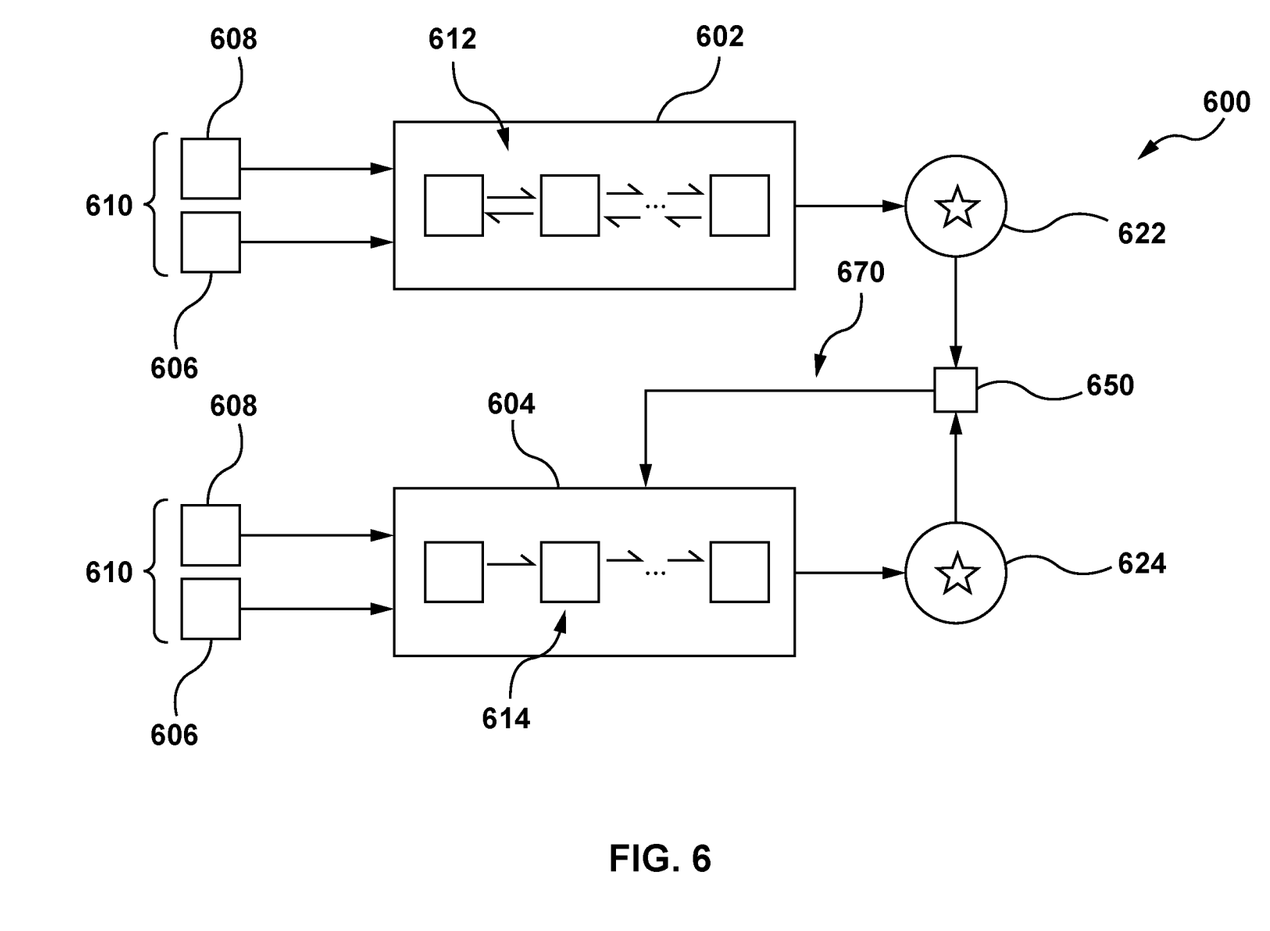
FIG. 6 depicts a training iteration of a student model based on a teacher model from a student-teacher network, as envisioned in some implementations of the present technology.
Figure 7:
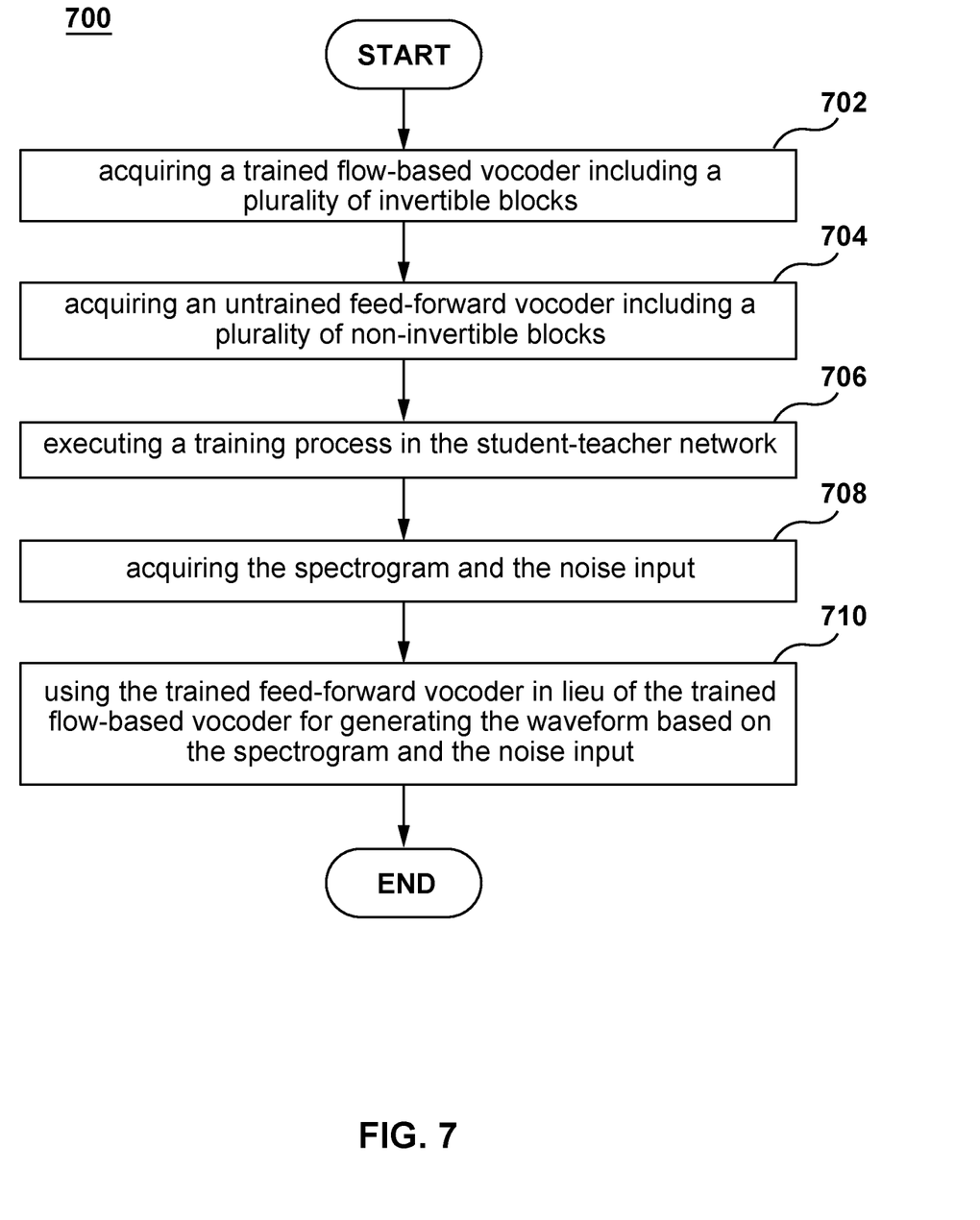
FIG. 7 is a schematic representation of a method executable by the server in accordance with at least some non-limiting embodiments of the present technology.

In some embodiments of the present technology, the server 106 is configured to execute a method 700 depicted in FIG. 7. Various steps of the method 700 will now be discussed in greater details with reference to both FIG. 6 and FIG. 7.

Step 702: Acquiring a Trained Flow-Based Vocoder Including a Plurality of Invertible Blocks The method 700 begins at step 702 with the server 106 acquiring a trained flow-based vocoder 602. The trained flow-based vocoder includes a plurality of invertible blocks 612. The trained flow-based vocoder has been trained to generate a waveform based on a pair of a spectrogram (conditioner) and a noise input.

In some embodiments, it is contemplated that the server 106 may be configured to first train the flow-based vocoder 602. For example, the server 106 may retrieve spectrogram-waveform pairs stored in the database 120 and use them for generating a plurality of training datasets. The server 106 may then be configured to perform a large number of training iterations based on the plurality of training datasets.

In at least some embodiments of the present technology, the spectrograms used during training and in-use of the conditional flow-based vocoder may be mel-scaled spectrograms. It should be noted that a given noise input during an in-use phase of the conditional flow-based vocoder may be representative of Gaussian distribution of noise values that can be sampled for generating a respective waveform. The conditional flow-based vocoder can be implemented as a normalizing-flow-based vocoder.

Step 704: Acquiring an Untrained Feed-Forward Vocoder Including a Plurality of Non-Invertible Blocks The method 700 continues to step 704 with the server 106 acquiring an untrained feed-forward vocoder 604. The untrained feed-forward vocoder 604 includes a plurality of non-invertible blocks 614. It is contemplated that the feed-forward vocoder 604 may be implemented as a given Convolutional Neural Network (CNN) based vocoder.

The server 106 may be configured to form a teacher-student network 600 including the trained flow-based vocoder 602 as a teacher model and the untrained feed-forward vocoder 604 as a student model. The server 106 may be configured to perform a distillation process for distilling knowledge from the trained flow-based vocoder 602 to the untrained feed-forward vocoder 604.

Step 706: Executing a Training Process in the Student-Teacher Network

The method 700 continues to step 716 with the server 106 configured to execute a training process in the student-teacher network 600 where the student model learns from the teacher model. The training process includes a number of training iterations. A given training iteration of the student-teacher network 600 can be said to include an in-use iteration of the teacher model and a training iteration of the student model.

As illustrated on FIG. 6, the server 106 may use the trained flow-based vocoder 602 for generating a teacher waveform 622 using a first spectrogram 608 and a first noise input 606, together forming a conditioner-noise input pair 610.

In some embodiments, it can be said that a given flow step (e.g., invertible block) of the trained flow-based vocoder 602 may receive the conditioner (the first spectrogram 608) for determining parameters of an affine-coupling representation. These parameters may then be applied to a noise sample from the noise (the first noise input 225). When a given waveform is being so-synthesized based on the conditioner, the flow-based vocoder can be said to have a "degree of freedom" for generating the given waveform since a number of waveforms may be generated for a same conditioner. As such, providing a noise input during the in-use phase of the flow-based vocoder allows to, in a sense, fix this degree of freedom such that the vocoder synthesizes a given waveform that corresponds to the conditioner and the noise input. The flow-based vocoder can perform sampling of the noise input during generation of the given waveform.

Also as illustrated on FIG. 6, the server 106 may use the conditioner-noise input pair 610 as inputs into the untrained feed-forward vocoder 604 for generating a student waveform 624. It should be noted that in the context of the present technology, the server 106 is configured to use the same conditioner-noise input pair for generating the teacher waveform 622 by the trained flow-based vocoder 602 and for generating the student waveform 624 by the untrained feed-forward vocoder 624.

The server 106 is then configured to generate a loss value 650 for the given training iteration using the teacher waveform 622 and the student waveform 624. For example, the loss value 650 may be a combination of (i) a reconstruction-based loss value being representative of a difference between the teacher waveform 622 and the student waveform 624, and (ii) a feature-based loss value being representative of a difference between features of between the teacher waveform 622 and the student waveform 624.

The server 106 is also configured to train the untrained feed-forward vocoder 604 using the loss value 650. For example, the training of the untrained feed-forward vocoder 604 may be performed in a supervised manner, including a back propagation loop 670 performed based on the loss value 650. It can be said that the server 106 may so-train the untrained feed-forward vocoder 604 for approximating a mapping between at least the first noise input 606 and the teacher waveform 622. It can also be said that the server 106 may so-train the untrained feed-forward vocoder 604 for approximating a mapping between the conditioner-noise input pair 610 and the teacher waveform 622.

It should be noted that a large number of such training iteration may occur during the training process in the student-teacher network 600 without departing from the scope of the present technology.

Step 708: Acquiring the Spectrogram and the Noise Input

The method 700 continues to step 708 with the server 106 configured to acquire a spectrogram a given spectrogram and a given noise input. For example, the server 106 may be configured to generate the spectrogram 215 based on the text 200. Also, the server 106 may retrieve the noise input 225 from the database 120 and/or generate the noise input 225 during an in-use iteration of the now trained feed-forward vocoder.

Step 710: Using the Trained Feed-Forward Vocoder in Lieu of the Trained Flow-Based Vocoder for Generating the Waveform Based on the Spectrogram and the Noise Input The method 700 continues to step 710 with the server 106 configured to use the now-trained feed-forward vocoder 604 in lieu of the trained flow-based vocoder 602 for generating the waveform 230 based on the spectrogram 215 and the noise input 225.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating a waveform based on a spectrogram and a noise input, the spectrogram having been generated based on a text, the waveform being a digital audio representation of the text, the method being executable by a server, the method comprising:
   acquiring, by the server, a trained flow-based vocoder including a plurality of invertible blocks, the trained flow-based vocoder having been trained to generate the waveform based on the spectrogram and the noise input;
   acquiring, by the server, an untrained feed-forward vocoder including a plurality of non-invertible blocks, the trained flow-based vocoder and the untrained feed-forward vocoder forming a student-teacher network;
   executing a training process in the student-teacher network, during a given training iteration of the training process:
      generating, by the server, a teacher waveform by the trained flow-based vocoder using a first spectrogram and a first noise input;
      generating, by the server, a student waveform by the untrained feed-forward vocoder using the first spectrogram and the first noise input;
      generating, by the server, a loss value for the given training iteration, wherein generating the loss value comprises:
         determining a reconstruction-based value based on a difference between the teacher waveform and the student waveform,
         determining a feature-based loss value based on a difference between features of the teacher waveform and features of the student waveform, and
         determining the loss value based on the reconstruction-based loss value and the feature-based loss value; and
      training, by the server, the untrained feed-forward vocoder to generate the waveform using the loss value for approximating a mapping between the first noise input and the teacher waveform of the flow-based vocoder;
   acquiring, by the server, the spectrogram and the noise input; and using, by the server, the trained feed-forward vocoder in lieu of the trained flow-based vocoder for generating the waveform based on the spectrogram and the noise input.

2. The method of claim 1, wherein the spectrogram is a mel-scaled spectrogram.

3. The method of claim 1, wherein the noise input is representative of a Gaussian distribution of noise values.

4. The method of claim 1, wherein the method further comprises storing, by the server, the trained feed-forward vocoder in a storage.

5. The method of claim 1, wherein the trained flow-based vocoder is a conditional normalizing-flow-based vocoder.

6. The method of claim 1, wherein the trained feed-forward vocoder is a Convolutional Neural Network (CNN) based vocoder.

7. A method of generating an output using a conditioning input and a noise input, the method executable by a server, the method comprising:
  acquiring, by the server, a trained conditional flow-based model including a plurality of invertible blocks, the trained conditional flow-based model having been trained to generate the output based on the conditioning input and the noise input;
  acquiring, by the server, an untrained feed-forward model including a plurality of non-invertible blocks,
    the trained conditional flow-based model and the untrained feed-forward model forming a student-teacher network;
  executing a training process in the student-teacher network, during a given training iteration of the training process:
    generating, by the server, a teacher waveform by the trained conditional flow-based model using a first conditioning input and a first noise input,
    generating, by the server, a student waveform by the untrained feed-forward model using the first conditioning input and the first noise input,
    generating, by the server, a loss value for the given training iteration, wherein generating the loss value comprises:
      determining a reconstruction-based loss value based on a difference between the teacher waveform and the student waveform;
      determining a feature-based loss value based on a difference between features of the teacher waveform and features of the student waveform; and
      determining the loss value based on the reconstruction-based loss value and the feature-based loss value, and
    training, by the server, the untrained feed-forward model by using the loss value for approximating a mapping between the first noise input and the teacher output of the conditional flow-based model;
  acquiring, by the server, the conditioning input and the noise input; and
  using, by the server, the trained feed-forward model in lieu of the trained conditional flow-based model for generating the output based on the conditioning input and the noise input.

8. The method of claim 7, wherein the trained conditional flow-based model is a trained conditional flow-based vocoder, the trained feed-forward model is a trained feed-forward vocoder, the conditioning input is a spectrogram, and the output is a waveform.

9. A server for generating a waveform based on a spectrogram and a noise input, the spectrogram having been generated based on a text, the waveform being a digital audio representation of the text, the server comprising at least one processor and at least one memory storing executable instructions which, when executed by the at least one processor cause the server to:
  acquire a trained flow-based vocoder including a plurality of invertible blocks, the trained flow-based vocoder having been trained to generate the waveform based on the spectrogram and the noise input;
  acquire an untrained feed-forward vocoder including a plurality of non-invertible blocks,
    the trained flow-based vocoder and the untrained feed-forward vocoder forming a student-teacher network;
  execute a training process in the student-teacher network, during a given training iteration of the training process comprises:
    generating a teacher waveform by the trained flow-based vocoder using a first spectrogram and a first noise input;
    generating a student waveform by the untrained feed-forward vocoder using the first spectrogram and the first noise input;
    generating a loss value for the given training iteration, wherein generating the loss value comprises:
      determining a reconstruction-based loss value based on a difference between the teacher waveform and the student waveform,
      determining a feature-based loss value based on a difference between features of the teacher waveform and features of the student waveform, and
      determining the loss value based on the reconstruction-based loss value and the feature-based loss value; and
    training the untrained feed-forward vocoder to generate the waveform using the loss value for approximating a mapping between the first noise input and the teacher waveform of the flow-based vocoder;
  acquire the spectrogram and the noise input; and
  use the trained feed-forward vocoder in lieu of the trained flow-based vocoder for generating the waveform based on the spectrogram and the noise input.

10. The server of claim 9, wherein the spectrogram is a mel-scaled spectrogram.

11. The server of claim 9, wherein the noise input is representative of a Gaussian distribution of noise values.

12. The server of claim 9, wherein the instructions further cause the server to store the trained feed-forward vocoder in a storage.

13. The server of claim 9, wherein the trained flow-based vocoder is a conditional normalizing-flow-based vocoder.

14. The server of claim 9, wherein the trained feed-forward vocoder is a Convolutional Neural Network (CNN) based vocoder.

* * * * *